United States Patent
Okuda et al.

(10) Patent No.: US 10,907,483 B2
(45) Date of Patent: Feb. 2, 2021

(54) TURBINE BLADE, EROSION SHIELD FORMING METHOD, AND TURBINE BLADE MANUFACTURING METHOD

(71) Applicant: MITSUBISHI HITACHI POWER SYSTEMS, LTD., Kanagawa (JP)

(72) Inventors: Takehisa Okuda, Tokyo (JP); Motonari Machida, Tokyo (JP); Yasuo Matsunami, Tokyo (JP)

(73) Assignee: MITSUBISHI POWER, LTD., Kanagawa (JP)

(*) Notice: Subject to any disclaimer, the term of this patent is extended or adjusted under 35 U.S.C. 154(b) by 1005 days.

(21) Appl. No.: 15/123,800

(22) PCT Filed: Apr. 1, 2015

(86) PCT No.: PCT/JP2015/060316
§ 371 (c)(1),
(2) Date: Sep. 6, 2016

(87) PCT Pub. No.: WO2015/156182
PCT Pub. Date: Oct. 15, 2015

(65) Prior Publication Data
US 2017/0016334 A1    Jan. 19, 2017

(30) Foreign Application Priority Data
Apr. 7, 2014  (JP) .................................. 2014-078907

(51) Int. Cl.
*F01D 5/28* (2006.01)
*B23K 26/34* (2014.01)
(Continued)

(52) U.S. Cl.
CPC ............ *F01D 5/286* (2013.01); *B23K 26/144* (2015.10); *B23K 26/147* (2013.01); *B23K 26/34* (2013.01);
(Continued)

(58) Field of Classification Search
CPC .......... B23K 2101/001; B23K 2103/26; B23K 26/144; B23K 26/147; B23K 26/34;
(Continued)

(56) References Cited

U.S. PATENT DOCUMENTS 6,264,429 B1 *   7/2001   Koeller ................... F01D 5/141
                                                        416/223 A
8,471,168 B2 *   6/2013   Ganesh ................ B23K 35/004
                                                        219/73

(Continued)

FOREIGN PATENT DOCUMENTS

CN       103668188      3/2014
JP       10-280907      10/1998
(Continued)

OTHER PUBLICATIONS

Translation CN n103668188 (Year: 2019).*
(Continued)

*Primary Examiner* — Ibrahime A Abraham
*Assistant Examiner* — Frederick F Calvetti
(74) *Attorney, Agent, or Firm* — Wenderoth, Lind & Ponack, L.L.P.

(57) ABSTRACT

A rotor blade includes: a blade main body having a tip as an upstream end in a rotation direction, and a blade surface in contact with the tip and which is an upstream surface in a flow direction of a work fluid; and an erosion shield formed as a cladding portion using laser welding on the tip and the blade surface. A boundary between the blade main body and the erosion shield is shaped to approach a surface opposite the blade surface from an end facing the blade surface towards the tip. The boundary includes a first arc that includes the end facing the blade surface and a second arc closer towards the tip than the first arc. The first arc is convex towards an inside of the blade main body and the (Continued)

second arc is convex towards an outside of the blade main body.

7 Claims, 6 Drawing Sheets

(51) Int. Cl.
*B23K 26/14* (2014.01)
*B23K 26/144* (2014.01)
*F01D 5/00* (2006.01)
*F01D 5/14* (2006.01)
*B23K 101/00* (2006.01)
*B23K 103/18* (2006.01)

(52) U.S. Cl.
CPC .............. *F01D 5/005* (2013.01); *F01D 5/141* (2013.01); *B23K 2101/001* (2018.08); *B23K 2103/26* (2018.08); *F05D 2220/30* (2013.01); *F05D 2240/303* (2013.01)

(58) Field of Classification Search
CPC .......... F01D 5/005; F01D 5/141; F01D 5/286; F05D 2220/30; F05D 2240/303
USPC .................................................. 219/121.64
See application file for complete search history.

(56) References Cited

U.S. PATENT DOCUMENTS

| | | | | |
|---|---|---|---|---|
| 2009/0123290 A1* | 5/2009 | Imano | .................... | B23K 9/044 416/241 R |
| 2009/0162207 A1* | 6/2009 | Peters | .................... | B23K 26/10 416/224 |
| 2009/0308847 A1* | 12/2009 | Kamimura | ......... | B23K 15/0086 219/76.1 |
| 2010/0028160 A1* | 2/2010 | Schaeffer | ................ | F01D 5/005 416/224 |
| 2012/0101761 A1* | 4/2012 | Lee | .................... | G01R 31/2868 702/85 |
| 2012/0266814 A1* | 10/2012 | Clark | .................. | B23K 26/0643 118/620 |
| 2013/0101791 A1* | 4/2013 | Hitschmann | .......... | B29C 43/021 428/141 |
| 2013/0316183 A1* | 11/2013 | Kulkarni, Jr. | ........... | B23P 6/007 428/557 |
| 2014/0209571 A1* | 7/2014 | Bruck | .................. | B23K 25/005 219/73.1 |
| 2015/0233257 A1* | 8/2015 | Fujiya | ..................... | F01D 5/288 416/224 |
| 2015/0275687 A1* | 10/2015 | Bruck | ..................... | B23P 6/045 277/345 |

FOREIGN PATENT DOCUMENTS

| | | |
|---|---|---|
| JP | 2006-16671 | 1/2006 |
| JP | 2006-291344 | 10/2006 |
| JP | 2008-93725 | 4/2008 |
| JP | 2009-214179 | 9/2009 |
| JP | 2012-86241 | 5/2012 |
| JP | 2014-28397 | 2/2014 |
| JP | 2014-29145 | 2/2014 |
| JP | 2014-173582 | 9/2014 |
| RU | 2 297 538 | 4/2007 |
| WO | 2006/094935 | 9/2006 |
| WO | 2008/015795 | 2/2008 |
| WO | 2014/046245 | 3/2014 |

OTHER PUBLICATIONS

Written Opinion of the International Searching Authority dated Jul. 7, 2015 in International (PCT) Application No. PCT/JP2015/060316, with English translation.
Office Action dated May 16, 2017 in corresponding Chinese Application No. 201580012248.2, with English translation.
Office Action dated May 9, 2019 in Indian Patent Application No. 201647030309.
International Search Report dated Jul. 7, 2015 in International (PCT) Application No. PCT/JP2015/060316.
Second Office Action dated Jan. 17, 2018 in corresponding Chinese Application No. 201580012248.2, with English translation.

* cited by examiner

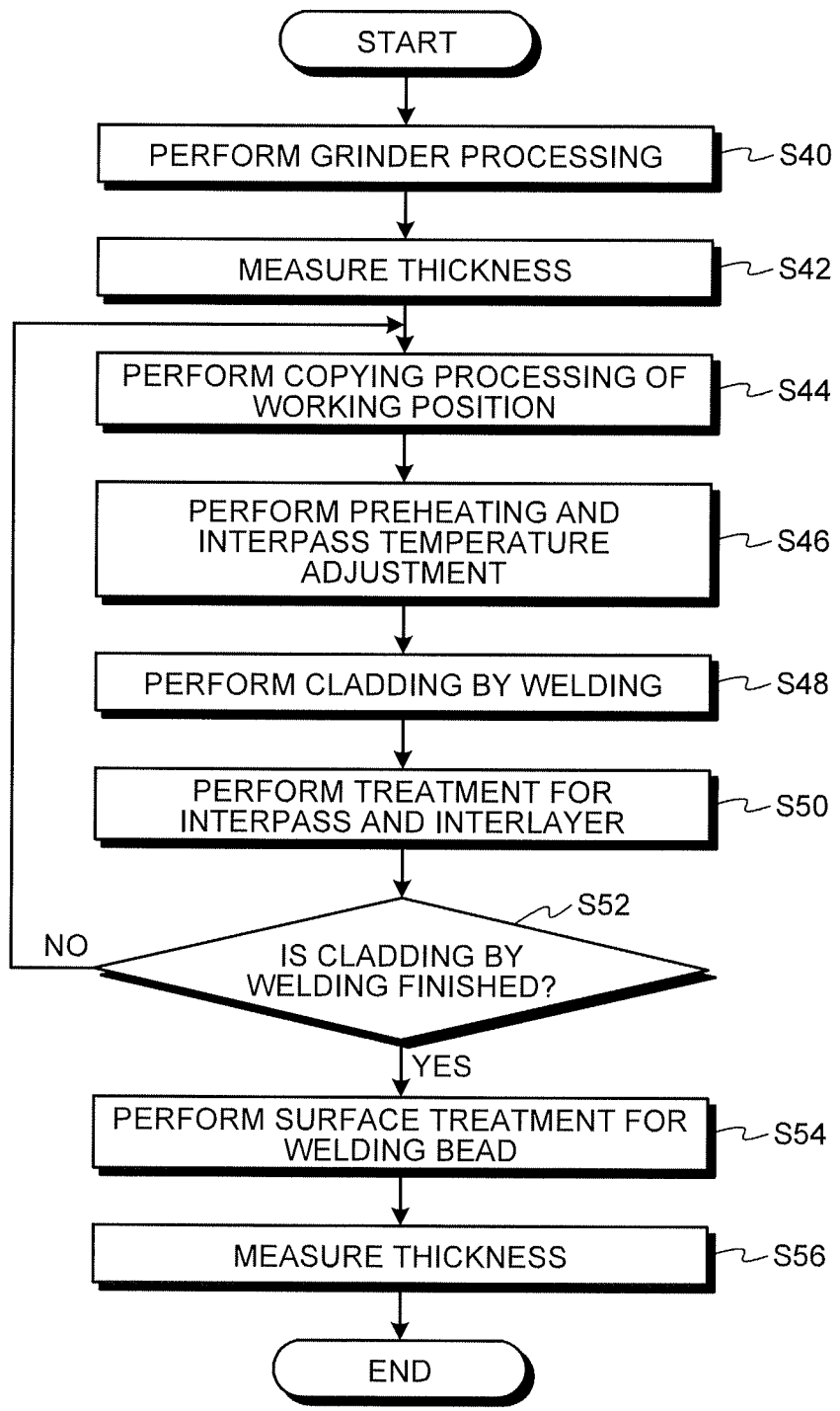

TURBINE BLADE, EROSION SHIELD FORMING METHOD, AND TURBINE BLADE MANUFACTURING METHOD

FIELD

The present invention relates to a turbine blade including an erosion shield, an erosion shield forming method, and a turbine blade manufacturing method.

BACKGROUND

In a general turbine (for example, steam turbine), a rotor that is a rotational shaft is rotatably supported at a casing, turbine blades are installed at an outer peripheral portion of this rotor, also turbine vanes are installed at an inner wall of the casing, and the multiple turbine blades and turbine vanes are alternately arranged on a steam passage. Furthermore, the turbine blades and the rotor are rotationally driven in a process in which steam flows in the steam passage.

The turbine blade includes a blade root portion fixed to a rotor disk of the rotor, a platform integrally formed with the blade root portion, and a blade portion having a base end portion joined to the platform and extending to a tip end portion side. Additionally, a plurality of turbine blades is fixed at their base ends to an outer peripheral portion of the rotor disk so as to be arranged in a row in a circumferential direction thereof.

For example, turbine blades of a steam turbine are rotated inside a route where steam flows. At this point, the steam near a final stage of a low-pressure steam turbine includes a large amount of small water droplets. Therefore, a front edge portion of a blade tip end is thinned due to erosion caused by high-speed collision of the water droplets.

As a countermeasure against such erosion, there is a method of forming an erosion shield at the front edge portion of the tip end of the turbine blade as disclosed in Japanese Patent Publication No. 10-280907 and Japanese Patent Publication No. 2012-86241, for example. In Japanese Patent Publication No. 10-280907, an erosion shield is formed by applying cladding by plasma transfer arc welding. Furthermore, Japanese Patent Publication No. 2012-86241 discloses a technology in which hard material powder is molten by high-density energy irradiation (laser and electron beam) to form a hard layer by cladding by welding, and an erosion preventing portion (erosion shield) is provided by locally replacing a part of a member with the hard layer.

SUMMARY

Technical Problem

In the case of forming an erosion shield by arc welding as disclosed in Japanese Patent Publication No. 10-280907, there may be a case in which a defect is generated or hardness is not sufficient. Furthermore, erosion shield performance can be improved by forming an erosion shield by cladding processing by laser welding as disclosed in Japanese Patent Publication No. 2012-86241. However, in the processing disclosed in Japanese Patent Publication No. 2012-86241, there may be a case in which an erosion shield falls off from a blade main body and is damaged.

The present invention is provided to solve the above-described problems, and directed to providing a turbine blade including an erosion shield having high resistance to erosion, an erosion shield forming method, and a turbine blade manufacturing method.

Solution to Problem

According to the present invention, there is provided a turbine blade installed in a turbine, comprising: a blade main body having a tip end which is an end portion in an upstream side in a rotational direction and a blade surface which is in contact with the tip end and which is a surface in an upstream side in a flow direction of working fluid; and an erosion shield which is formed by cladding by laser welding on at least part of the tip end and the blade surface of the blade main body, wherein a boundary between the blade main body and the erosion shield has a shape that approaches a surface opposite of the blade surface as the boundary moves from an end portion on the blade surface towards the tip end in a cross-section perpendicular to an extension direction, and the boundary includes a first arc which includes the end portion on the blade surface, a second arc which is arranged more towards the tip end side than the first arc, and a third arc which is arranged more towards the tip end side than the second arc, the first arc is convex towards inside of the blade main body, the second arc is convex towards outside of the blade main body, and the third arc is convex towards the outside of the blade main body.

According to the present invention, there is provided an erosion shield forming method for forming an erosion shield on at least part of a tip end and a blade surface of a blade main body, the erosion shield forming method comprising: removing at least part of a tip end and an end surface of a base body which is formed as a turbine blade to form a boundary; forming a cladding portion at the boundary by laser welding; and performing finish processing to remove an excess thickness portion of the base body and part of the cladding portion, wherein the boundary has a shape that approaches a surface opposite of the blade surface as the boundary moves from an end portion on the blade surface towards the tip end, and includes a first arc which includes the end portion on the blade surface, a second arc which is arranged more towards the tip end side than the first arc, and a third arc which is arranged more towards the tip end side than the second arc, the first arc is convex towards inside of the blade main body, the second arc is convex towards outside of the blade main body, and the third arc is convex towards the outside of the blade main body.

According to the present invention, there is provided a turbine blade manufacturing method, comprising: manufacturing a base body by molding the base body with an excess thickness portion on a turbine blade; and forming an erosion shield on the blade main body by the erosion shield forming method for forming an erosion shield on at least part of a tip end and a blade surface of a blade main body, the erosion shield forming method comprising: removing at least part of a tip end and an end surface of a base body which is formed as a turbine blade to form a boundary; forming a cladding portion at the boundary by laser welding; and performing finish processing to remove an excess thickness portion of the base body and part of the cladding portion, wherein the boundary has a shape that approaches a surface opposite of the blade surface as the boundary moves from an end portion on the blade surface towards the tip end, and includes a first arc which includes the end portion on the blade surface, a second arc which is arranged more towards the tip end side than the first arc, and a third arc which is arranged more towards the tip end side than the second arc, the first arc is convex towards inside of the blade main body, the second arc is convex towards outside of the blade main body, and the third arc is convex towards the outside of the blade main body.

Advantageous Effects of Invention

According to the present invention, it is possible to achieve the erosion shield that maintains hardness while suppressing generation of a defect by forming the boundary between the blade main body and the erosion shield in the above-described shape. Consequently, resistance to erosion can be improved.

BRIEF DESCRIPTION OF DRAWINGS

FIG. 8 is a flowchart illustrating an exemplary processing operation of cladding by welding.

DESCRIPTION OF EMBODIMENTS

A preferred embodiment of the present invention will be described in detail below with reference to the attached drawings. Note that the present invention is not limited by the embodiment. Furthermore, in the case where there are plural embodiments, a configuration combining the respective embodiments is to be included.

Figure 1:
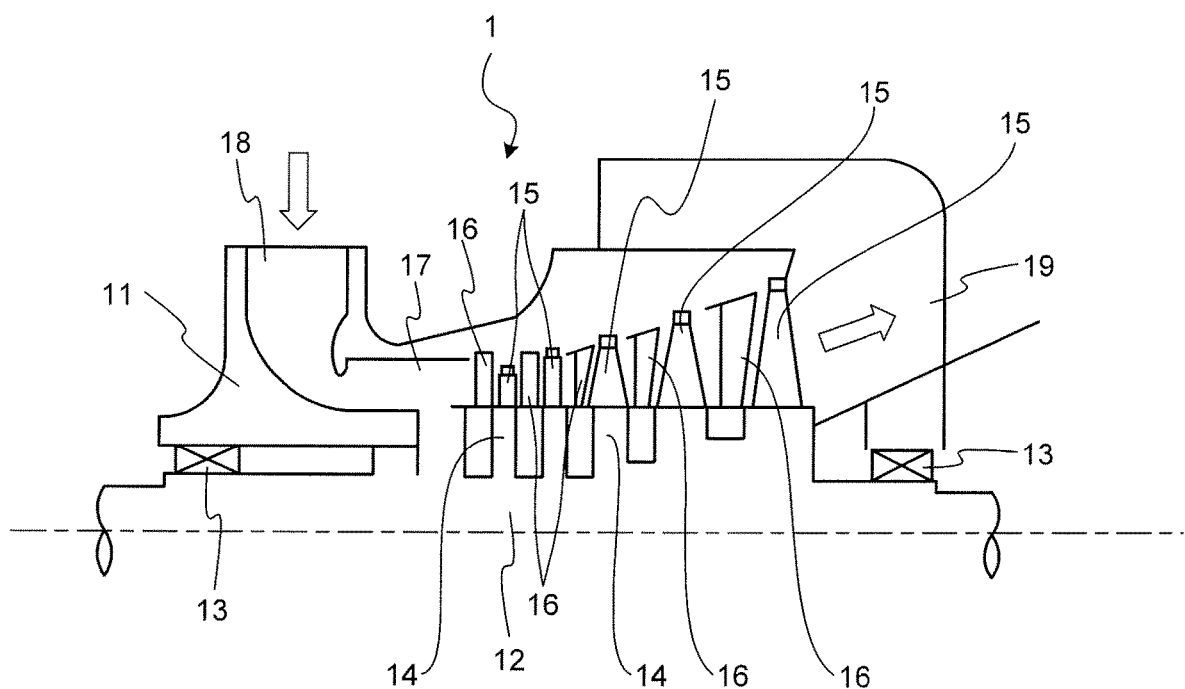
FIG. 1 is a schematic structural diagram illustrating a steam turbine including a turbine blade.

FIG. 1 is a schematic structural diagram illustrating a steam turbine provided with turbine blades according to the present embodiment. In the following, an outline of a structure of a steam turbine 1 according to the present embodiment will be described with reference to FIG. 1.

As illustrated in FIG. 1, in the steam turbine 1, a casing 11 has a hollow shape, and a rotor 12 as a rotational shaft is rotatably supported by a plurality of bearings 13. Turbine blades 15 and turbine vanes 16 are arranged inside the casing 11. A plurality of turbine blades 15 is arranged in a row and fixed in a circumferential direction of an outer periphery of a disk-shaped rotor disk 14 formed on the rotor 12. A plurality of multiple turbine vanes 16 is arranged in a row and fixed to an inner wall of the casing 11 in a circumferential direction thereof. These turbine blades 15 and turbine vanes 16 are alternately arranged in an axial direction of the rotor 12.

Furthermore, inside the casing 11, the above-described turbine blades 15 and turbine vanes 16 are arranged and a steam passage 17 through which steam passes is formed. In the steam passage 17, a steam supply port 18 is formed as an inlet port to be supplied with steam, and a steam discharge port 19 is formed as an outlet port to discharge steam.

Next, an outline of operation of the steam turbine 1 will be described with reference to FIG. 1. Steam supplied to the steam passage 17 from the steam supply port 18 of the steam turbine 1 expands in a process of passing the turbine vanes 16 and becomes high-speed steam current. The steam current having passed the turbine vanes 16 is blown to the turbine blades 15, and rotates the multiple turbine blades 15 and the rotor 12 attached with these turbine blades 15. For example, a generator and the like are connected to the rotor 12, and the generator is driven to generate power by rotation of the rotor 12. The steam having passed a portion provided with the turbine vanes 16 and the turbine blades 15 in the steam passage 17 is discharged from the steam discharge port 19.

Figure 2:
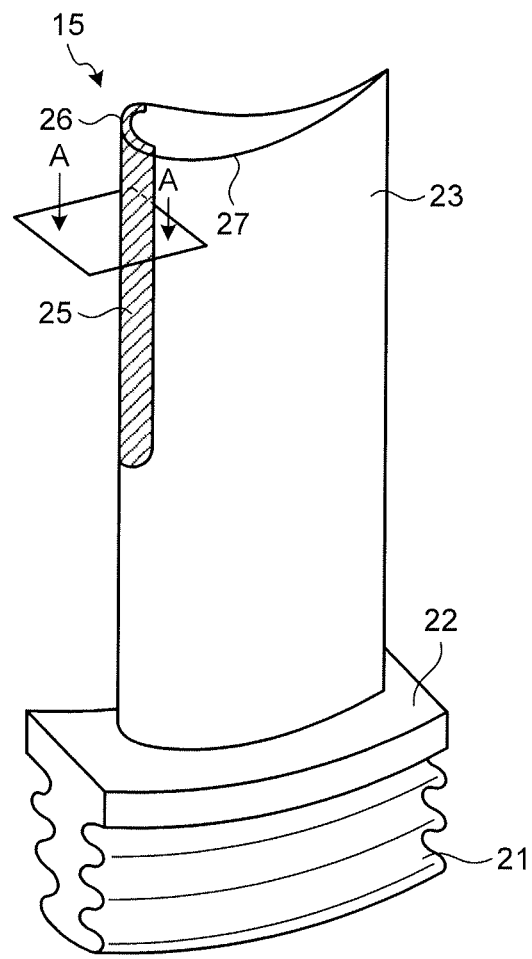
FIG. 2 is a perspective view illustrating an outline structure of an embodiment of the turbine blade.
Figure 3:
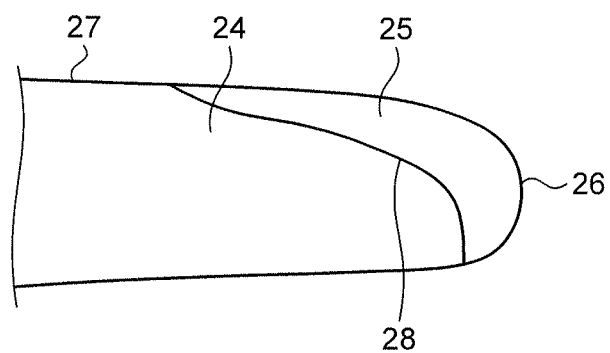
FIG. 3 is a cross-sectional view taken along A-A in FIG. 2.

FIG. 2 is a schematic diagram illustrating the turbine blade according to the present embodiment. FIG. 3 is a cross-sectional view taken along A-A in FIG. 2. A structure of the turbine blade 15 of the present embodiment will be described with reference to FIGS. 2 and 3. As illustrated in FIG. 2, the turbine blade 15 includes a blade root portion 21, a platform 22, and a blade portion 23. The blade root portion 21 is embedded in the rotor disk 14, and the turbine blade 15 is fixed to the rotor disk 14. The platform 22 is a curved plate-like object integrally formed with the blade root portion 21. The blade portion 23 has a base end portion fixed to the platform 22 and has a tip end portion extending to the inner wall side of the casing 11. The blade portion 23 may be twisted in a blade length direction. Furthermore, the turbine blade 15 may include a shroud fixed to the tip end portion of the blade portion 23. The shroud is a member configured to contact a shroud of an adjacent turbine blade 15 to fix the turbine blade 15 or configured to suppress vibration of the turbine blade 15.

Here, in the turbine blade 15, an erosion shield 25 is formed at a part of a surface of a blade main body 24 as illustrated in FIGS. 2 and 3. The erosion shield 25 is formed in a front edge portion of the turbine blade 15 corresponding to an upstream side of the steam current which flows by rotation of the turbine blade 15, that is, at a tip end 26 and a part of a blade surface 27 in the tip end 26 side. A borderline between the blade main body 24 and the erosion shield 25 is to be a boundary 28. The erosion shield 25 may be provided in a certain range on a side which is distant from the platform 22 in an extension direction of the turbine blade 15, that is, in a direction of the blade portion 23 separating away from the platform 22. In other words, the erosion shield may be formed only in a part located on a radially outer side during rotation. For the erosion shield 25, for example, wear resistant cobalt-based alloy such as Stellite (registered trademark) mainly containing cobalt can be used. The erosion shield 25 can be formed by performing cladding processing by laser welding (cladding by welding) on the surface of the blade main body 24 with target material (for example, Stellite (registered trademark)). Furthermore, the blade main body 24 is formed of chromium-based alloy and the like.

Figure 4:
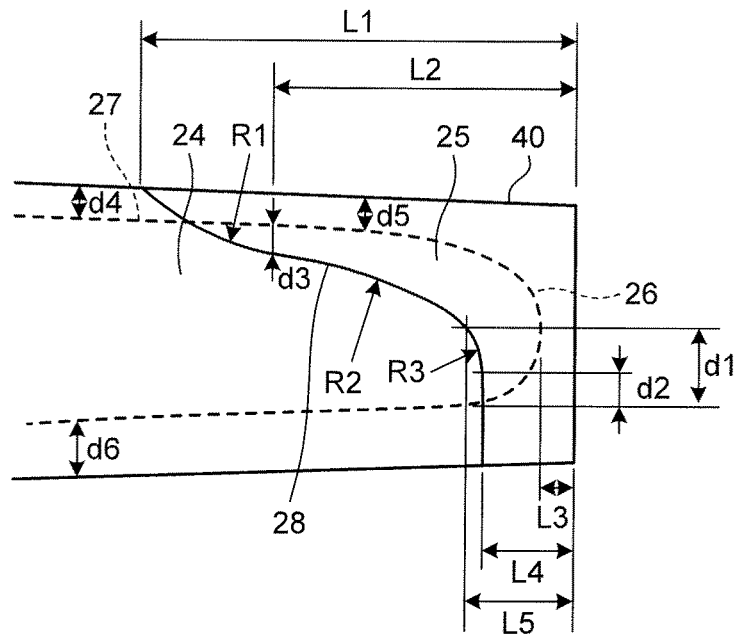
FIG. 4 is an explanatory diagram to describe a shape and a forming method of an erosion shield.
Figure 5:
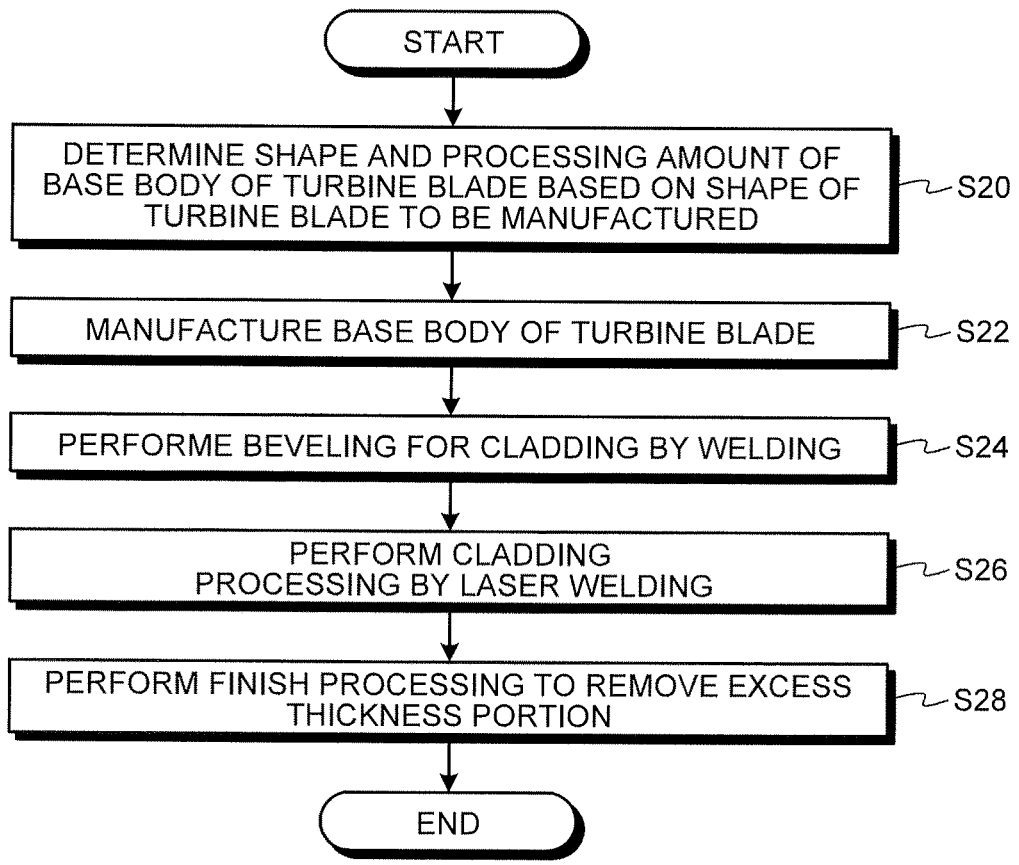
FIG. 5 is a flowchart illustrating an exemplary turbine blade manufacturing method.
Figure 6:
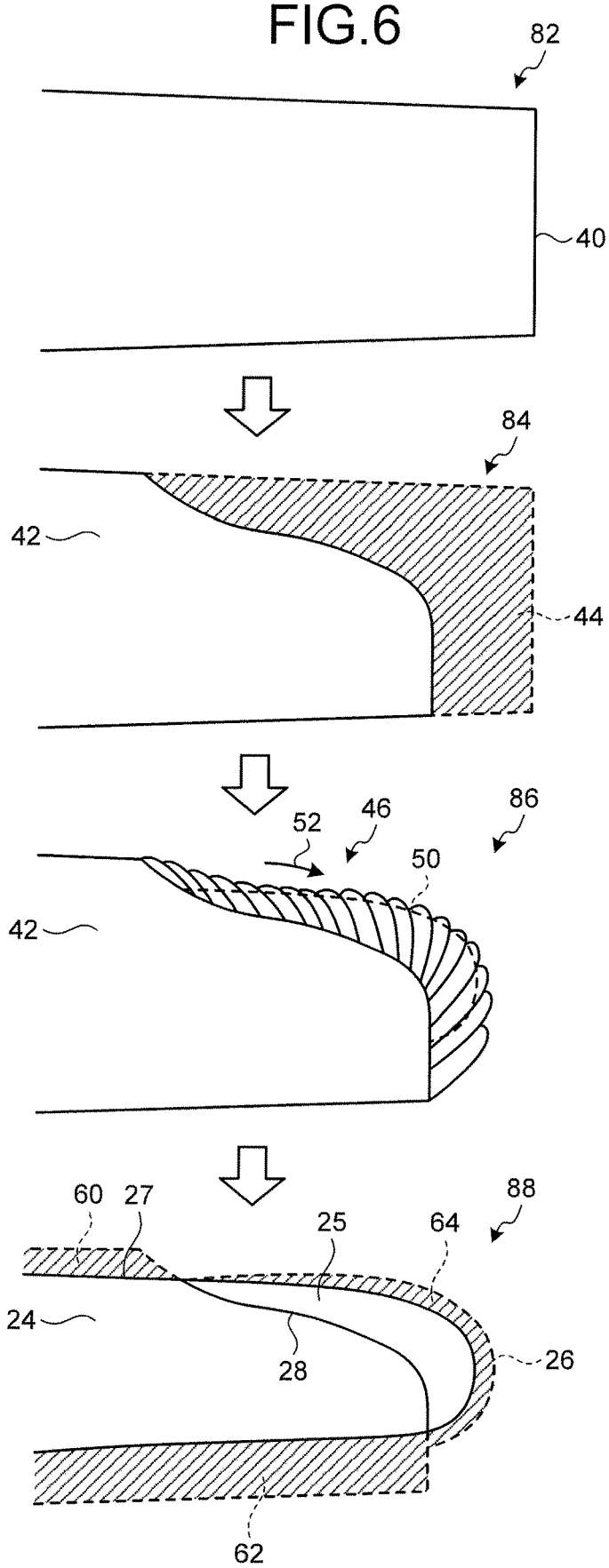
FIG. 6 is a schematic diagram illustrating an exemplary erosion shield forming method of the turbine blade manufacturing method.
Figure 7A:
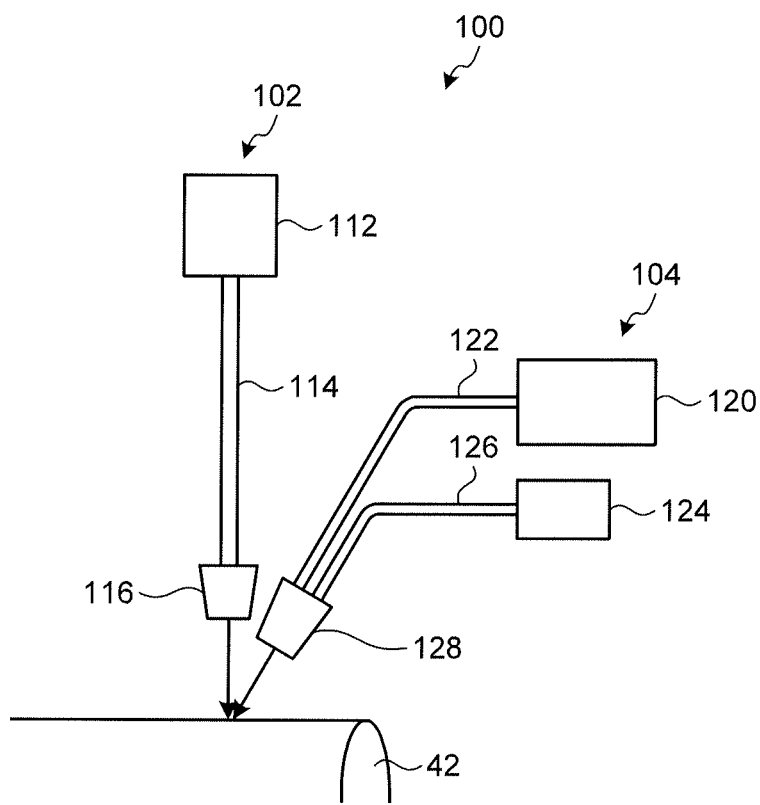
FIG. 7A is a schematic diagram illustrating an outline structure of a cladding-by-welding device.
Figure 7B:
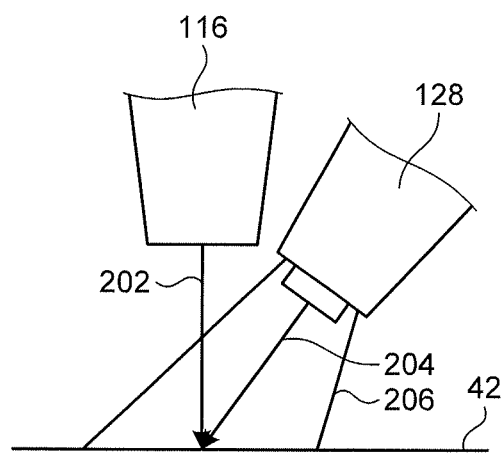
FIG. 7B is an enlarged view illustrating the outline structure of the cladding-by-welding device.

Next, a more detailed shape of the erosion shield, an erosion shield forming method, and a turbine blade manufacturing method will be described with reference to FIGS. 4 to 8. FIG. 4 is an explanatory diagram to describe the shape and the forming method of the erosion shield. FIG. 5 is a flowchart illustrating an exemplary turbine blade manufacturing method. FIG. 6 is a schematic diagram illustrating an exemplary erosion shield forming method of the turbine blade manufacturing method. FIG. 7A is a schematic diagram illustrating an outline structure of a cladding-by-welding device. FIG. 7B is an enlarged view illustrating the outline structure of the cladding-by-welding device. FIG. 8 is a flowchart illustrating an exemplary processing operation of cladding by welding.

As illustrated in FIG. 4, in the turbine blade 15, a groove for forming the erosion shield 25 is formed in a base body 40 for the blade main body 24 to form a boundary surface 28. After that, a material for the erosion shield 25 is formed by the cladding processing on the boundary 28, and then an excess thickness at a portion formed by the cladding processing and an excess thickness of the base body 40 are removed, thereby forming the tip end 26, blade surface 27, and a surface opposite of the blade surface 27.

Here, the boundary 28 is formed in a shape that comes closer to the surface opposite of the blade surface 27 as its position approaches from an end portion on the blade surface 27 to an end portion of the tip end 26. Furthermore, the boundary 28 is formed of: a curved surface (first curved surface) R1 located in the end portion on the blade surface 27 side which is convex towards the inside of the blade main body 24; a curved surface (second curved surface) R2 which is located closer to the tip end 26 side than the first curved surface R1 and is convex towards the outside of the blade main body 24; a curved surface (third curved surface) R3 which is located closer to the tip end 26 side than the second curved surface R2 and is convex towards the outside of the blade main body 24; and a straight line which is located between the third curved surface R3 and the surface opposite of the blade surface 27. The boundary 28 of the present embodiment has the first curved surface R1, second curved surface R2, and third curved surface R3 smoothly connected. Furthermore, in the boundary 28 of the present embodiment, a curvature radius of the first curved surface R1 is smaller than a curvature radius of the second curved surface R2. Additionally, in the boundary 28, a curvature radius of the third curved surface R3 is smaller than the curvature radius of the first curved surface R1.

As an example of each shape of the turbine blade 15 of the present embodiment, the curvature radius of the first curved surface R1 is 6.5 mm, the curvature radius of the second curved surface R2 is 10.0 mm, and the curvature radius of the third curved surface R3 is 2.5 mm.

In the boundary 28, a distance d1 from a contact point between the second curved surface R2 and the third curved surface R3 to the surface opposite of the blade surface 27 is 2.3 mm, and a distance d2 of the straight line located between the third curved surface R3 and the surface opposite of the blade surface 27 is 0.7 mm. In the turbine blade 15, a distance d3 from the blade surface 27 to a contact point between the first curved surface R1 and the second curved surface R2 is 0.8 mm. In the base body 40, distances d4 and d5 between a surface facing the blade surface 27 and the blade surface 27 are 1.0 mm. A distance d6 between a surface of the base body 40 facing the surface opposite of the blade surface 27 and the surface opposite of the blade surface 27 of the turbine blade 15 is 2.0 mm.

Furthermore, in the base body 40, a distance L1 from an end portion on the tip end 26 side to the end portion of the boundary 28 on the blade surface 27 side is 12.5 mm, and a distance L2 from the end portion on the tip end 26 side to the contact point between the first curved surface R1 and the second curved surface R2 is 9.0 mm. In the base body 40, a distance L3 from an end portion on the tip end 26 side to an end portion of the erosion shield 25 on the tip end 26 side is 1.0 mm. In the base body 40, a distance L4 from the end portion on the tip end 26 side to an end portion of the third curved surface R3 on the tip end 26 side is 2.7 mm. In the base body 40, a distance L5 from the end portion on the tip end 26 side to the contact point between the second curved surface R2 and the third curved surface R3 is 3.2 mm.

In the turbine blade 15, the boundary 28 between the blade main body 24 and the erosion shield 25 is formed in the shape that comes closer to the surface opposite of the blade surface 27 as the position approaches from the end portion on the blade surface 27 side to the end portion of the tip end 26, and includes the first curved surface R1 and the second curved surface R2, thereby erosion shield performance of the erosion shield 25 can be improved. Moreover, the blade main body 24 can be prevented from generation of a defect on the erosion shield 25, and hardness of the erosion shield 25 can be enhanced (more hardened). That is, dilution of a deposited material (metal of the erosion shield 25) with a parent material component (component of the blade main body 24) can be suppressed by the above-described relation between the blade main body 24 and the erosion shield 25 formed by the cladding by laser welding. Thereby, reduction of hardness of the erosion shield can be inhibited. Therefore, degradation of performance of the erosion shield can be suppressed. Furthermore, the metal of the erosion shield 25 is prevented from being cracked due to the dilution of the deposited metal with the parent material component. Additionally, welding defects such as incomplete fusion between the erosion shield 25 and the blade main body 24 as well as a blowhole can be suppressed from occurring.

Furthermore, in the present embodiment, while the first curved surface R1 and the second curved surface R2 are made to contact each other, the straight line portion may also be provided between the first curved surface R1 and the second curved surface R2. Furthermore, in the present embodiment, a curved surface may be provided between the third curved surface R3 and the surface opposite of the blade surface 27. Here, preferably, the boundary 28 is formed in a manner such that the first curved surface R1, second curved surface R2, and third curved surface R3 are smoothly connected and curvature radii become large. When the respective curved surfaces of the boundary 28 are made to have the large curvature radii, thickness variation of the erosion shield 25 can be made to be gradual in a direction along the boundary 28, and performance of the erosion shield 25 can be improved.

In the turbine blade 15, the distance d3 is shorter than a distance obtained by subtracting the distance L3 from the distance L4. In other words, the thickness of the erosion shield 25 on the tip end 26 side is thicker than that on the blade surface 27 side. With this structure, the thickness on the tip end 26 side where erosion is more likely to occur and an amount of thinning is large can be formed thick while the thickness on the blade surface 27 side where an amount of thinning is small can be formed thin.

The distances d4, d5 between the surface of the base body 40 facing the blade surface 27 and the blade surface 27, namely, a distance of an excess thickness portion on the blade surface 27 are set to 0.5 mm or more. When the distance of the excess thickness portion on the blade surface 27 is set to 0.5 mm or more, the surface can be prevented from being cracked at the time of processing. In the base body 40, preferably, the distance of the excess thickness portion on the blade surface 27 is set to 1 mm. Processing can be efficiently performed by setting the distance of the excess thickness portion on the blade surface 27 to 1 mm, especially to 1 mm or more.

Preferably, the distance d6 between the surface of the base body 40 facing the surface opposite of the blade surface 27 and the surface opposite of the blade surface 27 of the turbine blade 15, more specifically, a thickness of an excess thickness portion on the surface opposite of the blade surface 27 is equal to or thicker than the thickness of the excess thickness portion on the blade surface 27. By thus setting the thickness of the excess thickness portion on the surface opposite of the blade surface 27 to equal to or larger than the thickness of the excess thickness portion on the blade surface 27, processing can be efficiently performed. Furthermore, in the base body 40, preferably, a distance of the excess thickness portion on the surface opposite of the blade surface 27 is set to 2 mm. Furthermore, processing can be efficiently performed by setting the distance of the excess thickness portion on the surface opposite of the blade surface 27 side to 2 mm, especially to 2 mm or more.

Next, the turbine blade manufacturing method will be described using FIGS. 5 and 6. In the turbine blade manufacturing method, a shape and a processing amount of the base body 40 of a turbine blade are determined based on a shape of a turbine blade (rotor blade) to be manufactured (Step S20). More specifically, the shape and distances between respective positions of the base body 40 set as illustrated in FIG. 4 described above are determined, and the processing amount and a processing procedure are determined based on the shape.

In the turbine blade manufacturing method, after processing conditions are determined, the base body 40 of the turbine blade is manufactured based on the determined conditions (Step S22). In other words, the base body 40 that is a workpiece 82 illustrated in FIG. 6 is manufactured in the turbine blade manufacturing method. The base body 40 has a shape before the boundary 28 is formed in which an excess thickness portion and a portion located outer than the boundary 28 on the tip end remain. The base body 40 is formed by casting. For example, forging stock (for example, stainless and the like) heated up to a high temperature of a recrystallization temperature or higher is set inside a pair of upper and lower dies with the shape of the base body 40, and hot die forging is performed. After the hot die forging is finished, a forged product having the shape of the base body 40 is molded. The manufactured base body 40 of the molded and forged product in a high-temperature state is cooled, then unnecessary portions (burr) are removed, and then heat processing is applied to the forged product. Thereby, residual stress generated in the forged product in the preceding process (forging process) and heat stress generated in the forged product in the cooling process can be released. In this manner, the base body 40 is manufactured.

In the turbine blade manufacturing method, beveling for cladding by welding is performed after manufacturing the base body 40 (Step S24). In other words, beveling is performed for the workpiece 82 in FIG. 6, and a part 44 of a base body 42 is removed like a workpiece 84. Consequently, a portion on the tip end side of the base body 42 becomes as a curved surface formed along the boundary 28.

In the turbine blade manufacturing method, after beveling for cladding by welding, cladding processing is performed by laser welding (Step S26). In other words, the cladding by welding is applied to the workpiece 84 in FIG. 6, and a cladding portion 46 is formed on the base body 42 like a workpiece 86. The cladding portion 46 is formed of a metal (deposited metal) to be the erosion shield 25 in a range including an area 50 in which the erosion shield 25 is formed. Furthermore, the cladding processing is performed by setting an extension direction of the turbine blade 15, namely, a direction vertical to the drawing sheet of FIG. 6, as one pass. Moreover, when the cladding processing in the next pass is performed after the cladding processing in the previous pass, a processing position is moved in a direction indicated by an arrow 52. That is, the cladding processing starts from the end portion on the blade surface 27 in the area 50, and is gradually moved to the tip end 26, and ends up to the surface opposite of the blade surface 27.

In the turbine blade manufacturing method, a thickness of the area 50 can be prevented from being thick by forming the surface formed with the cladding portion 46 of the base body 42 into the curved surface formed along the boundary 28, and cladding portion in each position can be formed of the deposited metal for one pass (one layer). In other words, forming of the area 50 by multi-layer cladding by welding can be prevented, and also an area with reduced hardness in the area 50 cannot be presented in the surface of the area 50. Here, in the turbine blade manufacturing method, cladding portion 46 in each position can be formed of one layer by setting the thickness of the area 50 to 2 mm or less. The area having reduced hardness is an area where the parent material is mixed with the deposited metal and also is an area where performance of the erosion shield 25 (anti-erosion performance) obtained by the deposited metal is degraded.

Preferably, in the cladding portion 46, dilution with the parent material (material of base body 42) is 10% or less. In the turbine blade manufacturing method, the dilution with the parent material (material of base body 42) can be made to 10% or less by forming the cladding portion 46 by the cladding processing using laser described later. In the turbine blade manufacturing method, the deposited metal (the metal of the cladding portion 46, the metal to be the erosion shield 25) can be prevented from weld penetration by forming the surface formed with the cladding portion 46 of the base body 42 into the curved surface formed along the boundary 28, and the dilution with the parent component (material of base body 42) can be surely made to 10% or less. Furthermore, the cladding portion 46 is formed such that adjacent weld beads, namely, portions formed by adjacent passes overlap with each other. Furthermore, when the weld bead contacts the base body 42, preferably, the weld bead is formed such that a portion contacting other weld bead becomes larger than a portion contacting the base body 42. The cladding processing by laser welding (cladding by welding) will be described later.

In the turbine blade manufacturing method, finish processing to remove an excess thickness portion is performed after performing the cladding processing (Step S28). That is, the finish processing is applied to the workpiece 86 in FIG. 6, and an excess thickness portion 60 on the blade surface 27 side, an excess thickness portion 62 on the surface opposite of the blade surface 27, and an excess thickness portion 64 of the cladding portion 46 are cut off as shown by a workpiece 88. Consequently, the turbine blade 15 including the blade main body 24 and the erosion shield 25 is formed. After that, required heat processing (e.g., solution heat treatment and aging treatment) and the like are applied to the turbine blade 15, and required mechanical characteristics are provided to the turbine blade 15.

Next, the cladding processing by laser welding in Step S26 will be described more in detail using FIGS. 7A, 7B and FIG. 8. First, an outline structure of a cladding-by-welding device 100 to perform the cladding processing by laser welding will be described using FIGS. 7A and 7B. As illustrated in FIG. 7A, the cladding-by-welding device 100 includes a laser irradiation device 102 and a powder supply device 104. Furthermore, the cladding-by-welding device 100 includes a position adjustment mechanism, a mechanism to move a relative position with respect to the base body 42, a mechanism to perform copy processing of a working position, and the like in addition to the above-described components.

The laser irradiation device 102 includes a light source 112, an optical fiber 114, and a laser processing head 116. The light source 112 is a light emitting source to output laser. The optical fiber 114 guides the laser output from the light source 112 to the laser processing head 116. The laser processing head 116 outputs the laser guided by the optical fiber 114. The laser processing head 116 faces the working position of the base body 42 as illustrated in FIG. 7B, and irradiates laser 202 to the working position.

The powder supply device 104 includes a powder supply source 120, a powder supply line 122, an air supply source 124, an air supply line 126, and a powder supply head 128. The powder supply source 120 is a supply source to supply the deposited metal. The powder supply source 120 conveys the deposited metal as a mixed flow with air or the like, thereby performing supply to the powder supply line 122. The powder supply line 122 supplies the mixed flow of the air and the deposited metal supplied from the powder supply source 120 to the powder supply head 128. The air supply source 124 supplies inert gas as shielding gas (e.g., nitrogen and argon) at the working position, in the present embodiment, nitrogen gas of 99.999%. The air supply line 126 supplies the shielding gas supplied from the air supply source 124 to the powder supply head 128. The powder supply head 128 is a double tube nozzle in which a tube on an inner peripheral side and a tube on an outer peripheral side arranged on an outer periphery of the inner peripheral side are concentrically arranged. The powder supply head 128 injects, from the tube on the inner peripheral side, the mixed flow (powder) 204 of the air and deposited metal supplied via the powder supply line 122, and injects, from the tube on the outer peripheral side, shielding air 206 supplied from the air supply line 126. The powder supply head 128 faces the working position of the base body 42 as illustrated in FIG. 7B, and injects the powder 204 and the shielding air 206 to the working position.

The cladding-by-welding device 100 can weld the deposited metal included in the powder 204 to the base body 42 by irradiating the laser 202 to the working position of the base body 42 while supplying the powder 204. Furthermore, the cladding-by-welding device 100 can make an atmosphere at the working position to a predetermined atmosphere by injecting the shielding air 206 to the working position. More specifically, concentration of oxygen at the working position can be controlled.

Next, an exemplary processing operation of the cladding processing by laser welding will be described using FIG. 8. Furthermore, the processing illustrated in FIG. 8 can be executed by automatic control using a program and the like.

In the turbine blade manufacturing method, the surface of the area for grooving is treated by performing grinder processing (Step S40). The deposited metal to be welded by cladding by welding can be brought into a state easily welded to the surface (boundary) of the base body 42 by performing the grinder processing. In the turbine blade manufacturing method, thickness measurement is performed after the grinder processing (Step S42). In other words, a shape of an area to be formed with the erosion shield 25 is measured in the turbine blade manufacturing method.

In the turbine blade manufacturing method, copy processing of the working position is performed after performing the thickness measurement (Step S44). The position to be provided with a weld bead by injecting the deposited metal is specified irradiating the position with the laser. This adjusts a route in which each head is relatively moved to the base body 42.

In the turbine blade manufacturing method, preheating and interpass temperature adjustment are performed after performing the copy processing (Step S46). In the present embodiment, heating or cooling as needed is mainly performed such that the base body 42 reaches a predetermined temperature included in a range from 50° C. to 100° C. In the turbine blade manufacturing method, cladding by welding is performed after performing preheating and temperature adjustment (Step S48). More specifically, cladding by welding by one-pass is performed by using the cladding-by-welding device 100.

In the turbine blade manufacturing method, interpass and interlayer treatment is performed after performing the cladding by welding (Step S50). More specifically, flux, dirt, and the like adhering to the surface of the cladding portion 46 are removed. In the turbine blade manufacturing method, whether to finish the cladding by welding is determined after the treatment (Step S52). In other words, whether cladding by welding of all preset passes has been performed and the cladding portion 46 has been formed is determined. In the turbine blade manufacturing method, in the case of determining that the cladding by welding is not finished (No in Step S52), the process returns to Step S44 to perform the processing from the copy processing and perform the cladding by welding for the next-pass.

In the turbine blade manufacturing method, in the case of determining that the cladding by welding is finished (Yes in Step S52), surface treatment for the weld bead is performed (Step S54). More specifically, flux, dirt, and the like adhering to the surface of the cladding portion 46 are removed. After that, in the turbine blade manufacturing method, thickness measurement is performed (Step S56) to measure the shape of the cladding portion 46, and the processing ends.

In the turbine blade manufacturing method, highly-accurate processing can be performed by performing the cladding processing by laser welding (cladding by welding) in the manner of the above-described processing, and occurrence of a defect and the like can be suppressed as well. In the turbine blade manufacturing method, processing accuracy can be improved and a defect can be suppressed by performing Steps S40, S46, S50, and S54, but these steps may be omitted.

Furthermore, in the present embodiment, the copy processing is performed for each pass, but the copy processing may also be performed only before the first cladding by welding. In this case, a shape of a weld bead formed in each pass is calculated by calculation, and a copying position is determined based on this shape. Furthermore, in this case, preferably, a working position is obtained by a measurement instrument and feedback control is performed based on a result thereof. This can prevent occurrence of position displacement of the working position. The measurement position may be located on an upstream side of the working position.

Furthermore, in the cladding-by-welding device 100, preferably, an irradiation angle of the laser is set to about 90 degrees relative to a plane of the working position of the base body or a tangent line connecting a projecting portion and projecting portion. Since the irradiation angle of the laser angle is set to about 90 degrees relative to the plane of the working position of the base body or the tangent line connecting the projecting portion and the projecting portion close to the working position (for example, connecting a projecting portion of the weld bead and a projecting portion of the base body), welding failure can be prevented and mixture of the parent material into the deposited metal can be prevented.

Furthermore, the cladding-by-welding device 100 may oscillate the working position. For example, the laser may be made to weave at a high speed in a width direction (direction orthogonal to a pass) while the powder is supplied to the working position in a band-like shape. Here, the high speed is a speed at which energy density distribution of the laser at the working position becomes not convex shaped but rectangular shaped, and a diluted portion mixed with the parent material can be formed shallow. Weaving in the present embodiment is weaving performed at a frequency range from several tens Hz to several hundreds Hz. Consequently, the energy density distribution can be made flat, and a portion molten by the laser can be shallow and wide.

Additionally, in the above-described embodiment, the deposited metal is supplied as the powder, but may also be supplied by means of thermal spray, cold spray, and the like.

Furthermore, the present embodiment has been described for the turbine blade in the steam turbine as an application target, but not limited thereto. The present embodiment is applicable to a manufacturing method of a rotor blade in another rotary machine such as a gas turbine.

REFERENCE SIGNS LIST

1 STEAM TURBINE
11 CASING
12 ROTOR
13 BEARING
14 ROTOR DISK
15 TURBINE BLADE
16 TURBINE VANE
17 STEAM PASSAGE
18 STEAM SUPPLY PORT
19 STEAM DISCHARGE PORT
21 BLADE ROOT PORTION
22 PLATFORM
23 BLADE PORTION
24 BLADE MAIN BODY
25 EROSION SHIELD
26 TIP END
27 BLADE SURFACE
28 BOUNDARY
40, 42 BASE BODY
46 CLADDING PORTION
60, 62, 64 EXCESS THICKNESS PORTION
82, 84, 86, 88 WORKPIECE
100 CLADDING-BY-WELDING DEVICE
102 LASER IRRADIATION DEVICE
104 POWDER SUPPLY DEVICE

The invention claimed is:

1. An erosion shield forming method for forming an erosion shield on at least part of a tip end and a blade surface of a blade main body, the erosion shield forming method comprising:
removing at least part of a tip end and an end surface of a base body which is formed as a turbine blade to form a boundary;
forming a cladding portion at the boundary by laser welding, the cladding portion being one layer gradually formed by cladding in one direction from a blade surface side to a side opposite the blade surface such that the cladding portion is formed firstly at the blade surface side and formed lastly at the side opposite the blade surface, and an entirety of the cladding portion from the blade surface side to the side opposite the blade surface is formed with one layer; and
performing finish processing to remove an excess thickness portion of the base body and part of the cladding portion,
wherein:
the boundary has a shape that approaches a surface opposite the blade surface from an end portion on the blade surface towards the tip end, and includes a first arc which includes the end portion on the blade surface, a second arc which is closer towards a tip end side than the first arc, and a third arc which is closer towards the tip end side than the second arc;
the first arc is convex towards an inside of the blade main body;
the second arc is convex towards an outside of the blade main body; and
the third arc is convex towards the outside of the blade main body.

2. The erosion shield forming method according to claim 1, wherein, in the base body, the excess thickness portion on the blade surface has a thickness of 0.5 mm or more.

3. The erosion shield forming method according to claim 1, wherein, in the base body, a thickness of the excess thickness portion on the surface opposite the blade surface is equal to or thicker than a thickness of the excess thickness portion on the blade surface.

4. The erosion shield forming method according to claim 1, wherein the first arc and the second arc are smoothly connected in the boundary.

5. The erosion shield forming method according to claim 1, wherein the second arc has a curvature radius which is larger than a curvature radius of the first arc.

6. The erosion shield forming method according to claim 1, wherein a thickness of the erosion shield at the tip end is thicker than a thickness of the erosion shield between the first arc and the second arc.

7. A turbine blade manufacturing method, comprising:
manufacturing a base body by molding the base body with an excess thickness portion on a turbine blade; and
forming an erosion shield on at least part of a tip end and a blade surface of a blade main body by:
removing at least part of a tip end and an end surface of the base body which is formed as the turbine blade to form a boundary;
forming a cladding portion at the boundary by laser welding, the cladding portion being one layer gradually formed by cladding in one direction from a blade surface side to a side opposite the blade surface such that the cladding portion is formed firstly at the blade surface side and formed lastly at the side opposite the blade surface, and an entirety of the cladding portion from the blade surface side to the side opposite the blade surface is formed with one layer; and
performing finish processing to remove the excess thickness portion of the base body and part of the cladding portion,
wherein:
the boundary has a shape that approaches a surface opposite the blade surface from an end portion on the blade surface towards the tip end, and includes a first arc which includes the end portion on the blade surface, a second arc which is closer towards a tip end side than the first arc, and a third arc which is closer towards the tip end side than the second arc;

the first arc is convex towards an inside of the blade main body;

the second arc is convex towards an outside of the blade main body; and the third arc is convex towards the outside of the blade main body.

* * * * *